United States Patent
Ibrahim et al.

(10) Patent No.: US 10,712,810 B2
(45) Date of Patent: Jul. 14, 2020

(54) SYSTEM AND METHOD FOR INTERACTIVE 360 VIDEO PLAYBACK BASED ON USER LOCATION

(71) Applicant: TELEFONAKTIEBOLAGET LM ERICSSON (PUBL), Stockholm (SE)

(72) Inventors: Mohamed Ibrahim, Aachen (DE); Thorsten Lohmar, Aachen (DE); Ali El Essaili, Aachen (DE); Raphael Wagner, Herzogenrath (DE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

(21) Appl. No.: 15/835,840

(22) Filed: Dec. 8, 2017

(65) Prior Publication Data

US 2019/0179145 A1 Jun. 13, 2019

(51) Int. Cl.
*G06F 3/01* (2006.01)
*G02B 27/01* (2006.01)
(Continued)

(52) U.S. Cl.
CPC .......... *G06F 3/011* (2013.01); *G02B 27/0172* (2013.01); *G06F 3/04815* (2013.01);
(Continued)

(58) Field of Classification Search
CPC ................. G06F 3/011; G06F 3/04815; G06F 2203/012; G02B 27/0172;
(Continued)

(56) References Cited

U.S. PATENT DOCUMENTS 7,224,326 B2 * 5/2007 Sefton ................ A63B 71/0622
345/8
8,531,483 B1 * 9/2013 Schileru .............. G06F 3/04815
345/629

(Continued)

OTHER PUBLICATIONS

DVB, Virtual Reality—Prospects for DVB Delivery, Report of the DVB CM Study Mission on Virtual Reality, Draft 012—Jun. 2016, 90 pages.

(Continued)

*Primary Examiner* — Darlene M Ritchie
(74) *Attorney, Agent, or Firm* — Baker Botts, LLP (57) ABSTRACT

A system, method, and Head-Mounted Display (HMD) apparatus for recording a video and playing back the video to a viewer in a Virtual Reality (VR) environment. A geographical area is recorded with an omnidirectional video recording camera by dividing the geographical area into a plurality of area portions and recording in separate video sections, each of the area portions while moving the camera in different directions. Time points in each video section are associated with virtual locations of the viewer. At a time point providing the viewer with a choice of directions to proceed, the system receives the viewer's choice and presents to the viewer, a video section corresponding to the virtual location of the viewer and the desired direction of movement. The viewer's choice may be indicated by detecting a direction of the viewer's field of view or by receiving from the viewer, a response to a banner notification.

22 Claims, 9 Drawing Sheets

(51) Int. Cl.
*H04N 13/332* (2018.01)
*G06T 19/00* (2011.01)
*G06T 7/73* (2017.01)
*G06F 3/0481* (2013.01)
*G06T 15/20* (2011.01)
*H04N 21/81* (2011.01)

(52) U.S. Cl.
CPC ................ *G06T 7/73* (2017.01); *G06T 15/20* (2013.01); *G06T 19/003* (2013.01); *H04N 13/332* (2018.05); *G02B 2027/014* (2013.01); *H04N 21/816* (2013.01)

(58) Field of Classification Search
CPC ............ G02B 2027/014; G06T 19/006; G06T 19/003; G06T 15/20; G06T 7/73; G06T 7/70; G06T 7/97; A63B 24/0075; A63B 24/0084; A63B 2071/0638; H04N 7/157; H04N 13/111; H04N 13/117; H04N 13/279; H04N 13/332
See application file for complete search history.

(56) References Cited

U.S. PATENT DOCUMENTS

| | | | | |
|---|---|---|---|---|
| 10,102,226 | B1* | 10/2018 | Cosic | G06F 16/5866 |
| 2001/0056574 | A1* | 12/2001 | Richards | G06F 3/011 |
| | | | | 725/36 |
| 2002/0093541 | A1 | 7/2002 | Schileru-Key | |
| 2006/0114251 | A1 | 6/2006 | Miller | |
| 2007/0061076 | A1* | 3/2007 | Shulman | G01C 11/00 |
| | | | | 701/500 |
| 2007/0070069 | A1* | 3/2007 | Samarasekera | G06F 3/011 |
| | | | | 345/427 |
| 2012/0120069 | A1* | 5/2012 | Kodaira | G06T 15/205 |
| | | | | 345/419 |
| 2015/0085068 | A1* | 3/2015 | Becker | G06T 3/0087 |
| | | | | 348/39 |
| 2015/0371449 | A1* | 12/2015 | Cespedes Narbona | |
| | | | | H04W 4/043 |
| | | | | 345/633 |
| 2016/0071301 | A1 | 3/2016 | Oh et al. | |
| 2016/0300392 | A1* | 10/2016 | Jonczyk | G06T 19/003 |
| 2016/0371883 | A1* | 12/2016 | Merkine | A61B 6/032 |
| 2016/0379415 | A1* | 12/2016 | Espeset | G06T 15/04 |
| | | | | 345/633 |
| 2017/0061687 | A1* | 3/2017 | Hong | G06T 19/003 |
| 2017/0228930 | A1* | 8/2017 | Seif | G06T 19/006 |
| 2017/0257564 | A1* | 9/2017 | Billinghurst | H04N 5/23238 |
| 2018/0036591 | A1* | 2/2018 | King | H04L 67/306 |
| 2018/0189254 | A1* | 7/2018 | Sutton | G06F 3/013 |
| 2018/0192094 | A1* | 7/2018 | Barnett | G06K 9/52 |
| 2018/0234669 | A1* | 8/2018 | Chen | H04N 5/23238 |
| 2018/0288557 | A1* | 10/2018 | Najaf-Zadeh | H04N 21/21805 |
| 2018/0332267 | A1* | 11/2018 | Hesla | H04N 5/9201 |
| 2018/0341811 | A1* | 11/2018 | Bendale | G06T 7/593 |
| 2018/0356635 | A1* | 12/2018 | Haley | G02B 27/017 |
| 2018/0373413 | A1* | 12/2018 | Sawaki | G06F 3/04815 |
| 2019/0022492 | A1* | 1/2019 | Takahashi | A63B 69/00 |
| 2019/0208179 | A1* | 7/2019 | Kasahara | G06T 3/00 |

OTHER PUBLICATIONS

Biswas J., Veloso M., "Depth Camera Based Indoor Mobile Robot Localization and Navigation", 2012 IEEE International Conference on Robotics and Automation, Saint Paul, MN, 2012, pp. 1697-1702. May 2012.

Flyabout: Spatially Indexed Panoramic Video by Don Kimber et al.—May 21, 2013.

PCT Notification of Transmittal of the International Search Report and the Written Opinion of the International Searching Authority, or the Declaration for International application No. PCT/IB2018/059630—dated Mar. 28, 2019.

* cited by examiner

FIXED POSITION CONTENT

*FIG. 1A*
*(Prior Art)*

FIXED POSITION PANORAMIC 360° CONTENT

*FIG. 1B*
*(Prior Art)*

FIXED POSITION SPHERICAL CONTENT

*FIG. 1C*
*(Prior Art)*

FREE VIEWPOINT CONTENT

*FIG. 1D*
*(Prior Art)*

6 DOF

```
1    <?xml verison="1.0"?>
2    <Video name="virtual tour">
3        <v1 location ="corridor" length="30sec"
     actions=1>
4            <timeline start="5sec" end="10sec">
5                <direction left="v2">
6                    <FOV range="30-80"></FOV>
7                </direction>
8                <direction right="v3">
9                    <FOV range="40-90"></FOV>
10               </direction>
11               <direction forward="v1">
12                   <FOV range="0-40"></FOV>
13               </direction>
14           </timeline>
15       </v1>
16       <v3 location ="Hall-1" length="50sec"
     actions=1>
17           <timeline start="45sec" end="50sec">
18               <direction left="v4">
19                   <FOV range="20-50"></FOV>
20               </direction>
```

*FIG. 13*

SYSTEM AND METHOD FOR INTERACTIVE 360 VIDEO PLAYBACK BASED ON USER LOCATION

TECHNICAL FIELD

The present disclosure relates to Virtual Reality (VR) systems and, in particular, to a system, method, and Head Mounted Display (HMD) for recording and playing back a 360 video to a viewer in a VR environment.

BACKGROUND

Virtual Reality (VR) Head Mounted Displays (HMDs) allow users to experience a full 360 degree of a virtual environment. With Computer Generated Graphics such as those from computer games, the user is enabled to interact with the scene and to move freely in the VR environment (i.e., six degrees of freedom, 6DoF).

Increasing numbers of people record videos with 360 degree cameras, which allow viewers to look around, but only from the camera location. Typically, only a regular 2D video is recorded, but there are also 3D stereoscopic capturing systems. However, 360 video today can only allow three degrees of freedom (3DoF) for the audience, since the audience must follow the movement of the camera.

It is possible to capture the 360 video from different positions (free viewpoint content) as described in "DVB, Virtual Reality—Prospects For DVB Delivery," Report of the DVB CM Study Mission on Virtual Reality, Draft 012—June 2016.

Figure 1A:
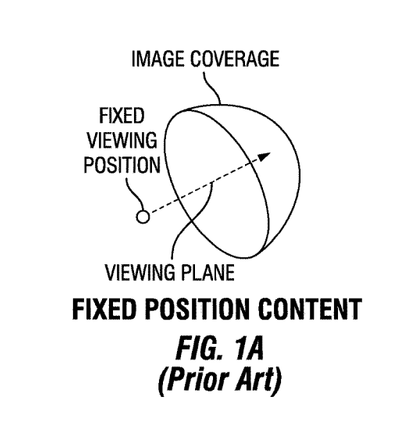
FIGS. 1A-1E (Prior Art) illustrate several conventional video recording alternatives for 360 video.
Figure 1B:
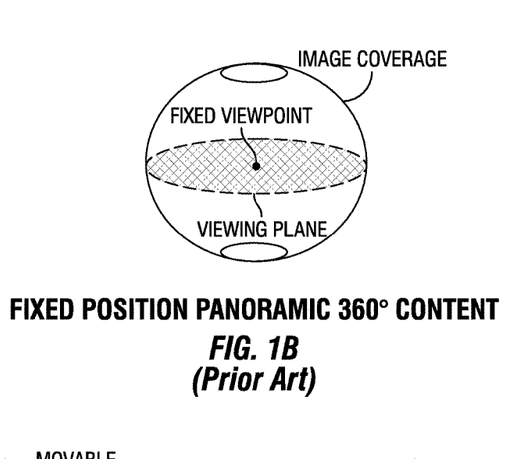
Figures 1C, 1D:
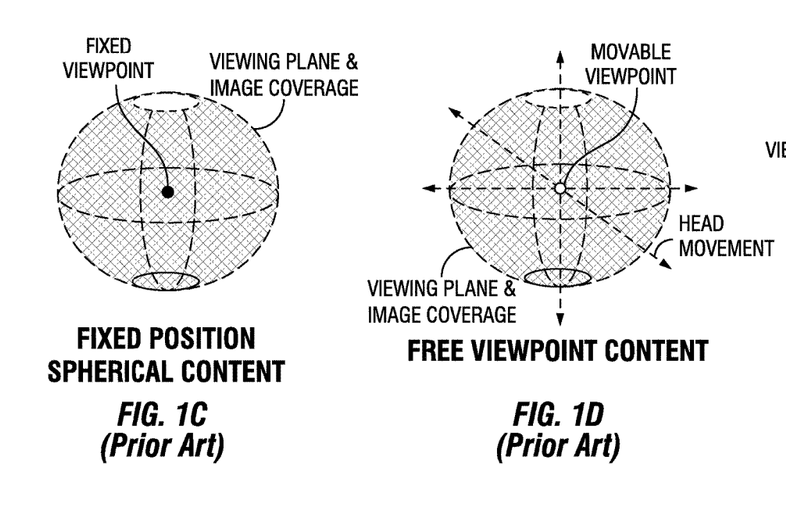
Figure 1E:
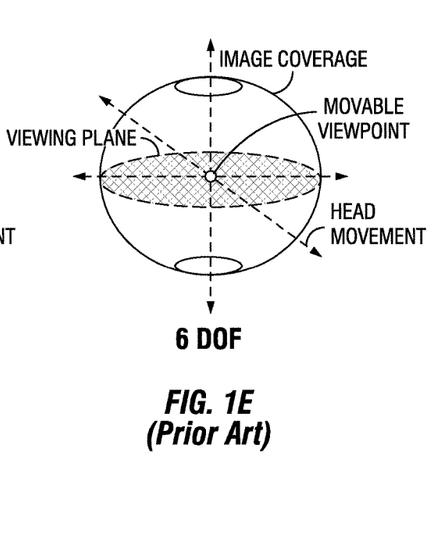

FIGS. 1A-1E illustrate several conventional alternatives for recording 360 video with an omnidirectional camera. FIG. 1A illustrates an alternative that captures the video from a fixed viewpoint position in a single viewing direction, resulting in a 180-degree panorama. FIG. 1B illustrates an alternative that captures the video from a fixed viewpoint position while viewing in the left or right directions, resulting in a 360-degree panorama, which may not capture the poles. FIG. 1C illustrates an alternative that captures the video from a fixed viewpoint position while viewing from any angle, providing fixed-position spherical content. Videos optimized for horizontal stereoscopic viewing require correction at the poles to avoid distortion due to parallax. FIG. 1D illustrates an alternative that captures the video from a movable viewpoint where the content is captured from different viewpoints, enabling the user to change his/her head position. This typically means recording different versions of the content from different positions. FIG. 1E illustrates an alternative that captures the video from a free viewpoint using 3D modeling or computer generated imagery (CGI) or using camera arrays known as light fields. This alternative is known as 6DoF. While this is quite mature for CGI content, light fields are typically used in laboratory environments.

360 video and VR are currently explored in many different environments and many different combinations. One use-case is to create a virtual 3D representation of a certain event or place (for example a museum) and the viewer can make a virtual tour of the museum on an HMD.

Approaches for real-time navigation in indoor and outdoor environments are considered today. In particular, for indoor environments where a GPS signal is not used, approaches such as Simultaneous Localization and Mapping (SLAM) are deployed. This process is described in further detail in J. Biswas and M. Veloso, "Depth camera based indoor mobile robot localization and navigation," 2012 IEEE International Conference on Robotics and Automation, Saint Paul, Minn., 2012, pp. 1697-1702. Basically, SLAM attempts to create a map of the environment by scanning the environment and localizing an object in the environment by comparing depth camera images against the scanned environment. 3D representations such as point clouds are commonly used for scanning the environment.

A 360 video gives a viewer the ability to move his/her head during the playback of the video, and explore the surroundings to a limited extent. The usage of HMDs with 360 videos brings an immersive experience to viewers and separates it from conventional video recording, where the cameraman is controlling the field of view. In 360 video, the viewer has the freedom to look wherever desired.

However, current 360 video recording does not give the viewer a transparent experience (i.e., interacting with the offering) to move around the recorded scene and explore the surroundings. This is because the video is bounded by the directions the cameraman took during the recording. Even for free viewpoint recording, interactivity is not considered as providing different videos depending on which events the viewer is encountering. Point clouds can be used to create position maps. However, an event map, meaning what events are available for the user at a current position, is not really considered.

Figure 2:
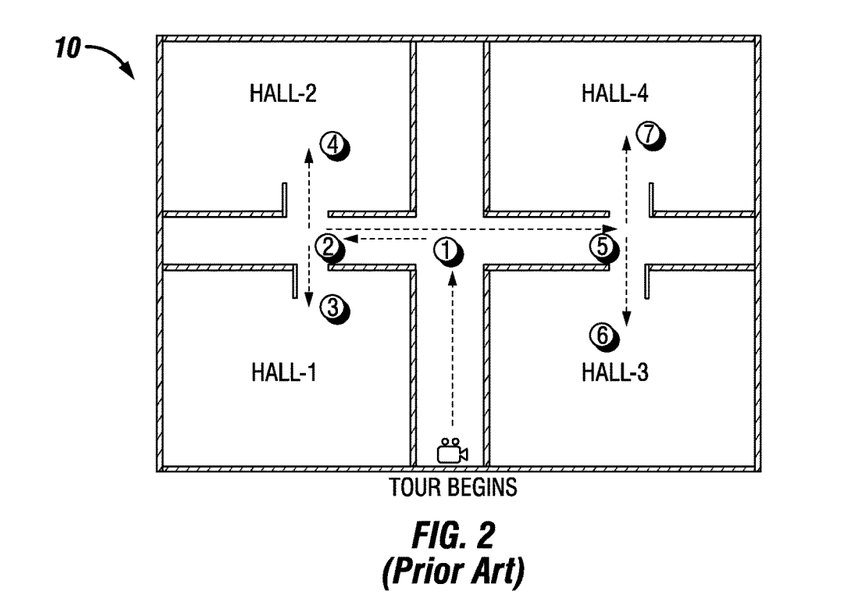
FIG. 2 (Prior Art) illustrates a conventional video recording of a virtual tour of a building.

FIG. 2 illustrates a conventional video recording of a virtual tour of a building 10 that includes two intersecting corridors and four Halls. The cameraman records the tour by moving in sequence to locations 1-7. This recording sequence restricts the tour to that sequence. This means the viewer must follow the video recording timeline, going through locations 1-7 to explore the tour with the same sequence as the video was captured. Thus, the viewer will sequentially go through Hall-1, Hall-2, Hall-3, and Hall-4. If the viewer desires to visit the halls in a different order, for example visit Hall-4 at the beginning of the tour, the viewer has to search forward to near the end of the video until he/she reaches the timeline where Hall-4 is viewed. If the viewer desires to visit Hall-1 after Hall-4, he/she has to search backward again to the beginning of the video. This type of scenario greatly interrupts the experience of the viewer. To avoid back-and-forth searching, the only option the viewer has is to follow the video capturing sequence and waste time looking at views that are less interesting to him/her.

SUMMARY

The present disclosure provides a system and method for recording videos and playing back the videos in a VR environment. Exemplary embodiments described herein specifically target a use-case of a virtual guided tour, where the user has more freedom to control the playback of the recorded video. A certain environment is recorded with a 360 video camera, and the user is enabled to experience the recorded environment more freely. The system creates a map based on recorded video sections and associates time points within the videos to certain locations and/or events. Thus, when a user has watched a certain video A until time point X, the exact location of the user is known. Depending on the location of the user, one or more possibilities for interactivity are provided. For example, a virtual crossing of corridors in a building may be presented where the user can decide to go in one direction where a first video is played or another direction resulting in a different, second video being played. The decision to go in one direction or another can be based on head movement of the user (i.e., field of view) or through overlays provided to the user at the right time point in the video.

The disclosed solution enhances the interactive experience of 360 videos. The solution gives the viewer more freedom to interact with the playback of the recorded 360 experience in order to enable, virtually, the impression of moving in different directions during the experience. When the viewer reaches a certain area in the experience, such as a visible crossroad or a door, the viewer has the option to choose which path to take. According to the viewer's decision, a new video is integrated seamlessly into the experience.

In order to highlight possible choices in the virtual tour, the video playback may be automatically slowed down and the option to continue the tour in a different direction may be offered as one or more graphical overlays. The following disclosure describes in detail how to program a client and the 360 video to allow the viewer to choose directions.

In one embodiment, the present disclosure is directed to a method of recording a video and playing back the video to a viewer in a Virtual Reality (VR) environment. The method includes recording a geographical area with an omnidirectional video recording camera, wherein recording includes dividing the geographical area into a plurality of area portions; and recording in separate video sections, each of the area portions while moving the camera in multiple directions, wherein each video section comprises a video of a given area portion recorded while moving in a given direction. The method also includes associating time points in each video section with virtual locations of the viewer; receiving an indication of a desired direction of movement from the viewer at a given time point in a given video section; and presenting to the viewer, a video section corresponding to the virtual location of the viewer and the desired direction of movement associated with the given time point in the given video section.

In another embodiment, the present disclosure is directed to a method of recording a video and playing back the video to a viewer in a VR environment, wherein the method includes recording a geographical area with a video recording camera moving in a forward direction through the geographical area to create a first video section, and moving in a backward direction through the geographical area to create a second video section; associating time points in the first and second video sections with virtual locations of the viewer; and on a video player, playing back the first video section to the viewer. The method also includes detecting that the viewer has reversed a field of view from the forward direction to the backward direction at a reversal time point prior to the end of the first video section; and on the video player, presenting the second video section to the viewer beginning at a virtual location corresponding to the reversal time point in the second video section.

In another embodiment, the present disclosure is directed to a Head-Mounted Display (HMD) apparatus configured to present a plurality of video sections to a viewer. The HMD apparatus includes a processing circuit coupled to a non-transitory memory configured to store computer readable program code; a video player; and an application configured to interface with a server to retrieve a manifest and the plurality of video sections; wherein when the processing circuit executes the computer readable program code, the HMD apparatus is caused to present to a viewer, a plurality of video sections defined by the manifest, wherein the plurality of video sections is presented in a sequence determined by choices made by the viewer by positioning a field of view or responding to at least one banner notification.

In another embodiment, the present disclosure is directed to a video recording and playback system, which includes a database configured to store a manifest and a plurality of video sections recorded in a geographical area; a server configured to retrieve the manifest and the plurality of video sections from the database; and a Head-Mounted Display (HMD) apparatus configured to present the video sections to a viewer. The HMD apparatus includes a processing circuit coupled to a non-transitory memory configured to store computer readable program code; a video player; and an application configured to interface with a server to retrieve the manifest and the plurality of video sections. When the processing circuit executes the computer readable program code, the HMD apparatus is caused to present to a viewer, a plurality of video sections defined by the manifest, wherein the plurality of video sections is presented in a sequence determined by choices made by the viewer by positioning a field of view or responding to at least one banner notification.

The disclosed solution adds value to 360 video experiences, where virtual video tours are enabled by providing the needed interactivity to virtually and freely move inside of the virtual tour. The solution brings more excitement and enriches the experience of the virtual tour. The viewer can interactively control which parts of the tour he/she would like to explore and the order in which the virtual tour is conducted. This saves time for the viewer and makes him/her more engaged with the 360 video experience. The solution can be used as a stepping stone to describe how video players can render 360 videos with more interactivity from the viewer by switching to different videos depending on the head movement and/or direction chosen by the user.

BRIEF DESCRIPTION OF THE DRAWINGS

The accompanying drawings are incorporated into and form a part of the specification to illustrate one or more exemplary embodiments of the present disclosure. Various advantages and features of the disclosure will be understood from the following Detailed Description taken in connection and with reference to the attached drawing Figures in which.

DETAILED DESCRIPTION

In the following description, numerous specific details are set forth with respect to one or more embodiments of the present patent disclosure. However, it should be understood that one or more embodiments may be practiced without such specific details. In other instances, well-known circuits, subsystems, components, structures, and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

One or more embodiments of the present disclosure may be implemented using different combinations of software with firmware and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

The disclosed solution attaches timed metadata along with the timeline of the video. During or after the making of the video, the producer identifies the points on the video timeline and the associated field of view where the viewer can choose to move between different specific areas or directions. The metadata may be stored in any storage format (for example, Extensible Markup Language (XML), JavaScript Object Notation (JSON), Yet Another Markup Language (YAML), or inside the video file as a metadata track in MP4 format) and sent with the video. The metadata allows the client device to create a map of interactive elements and changes in the video playback. It describes the location of the viewer during the 360-virtual tour.

Figure 3:
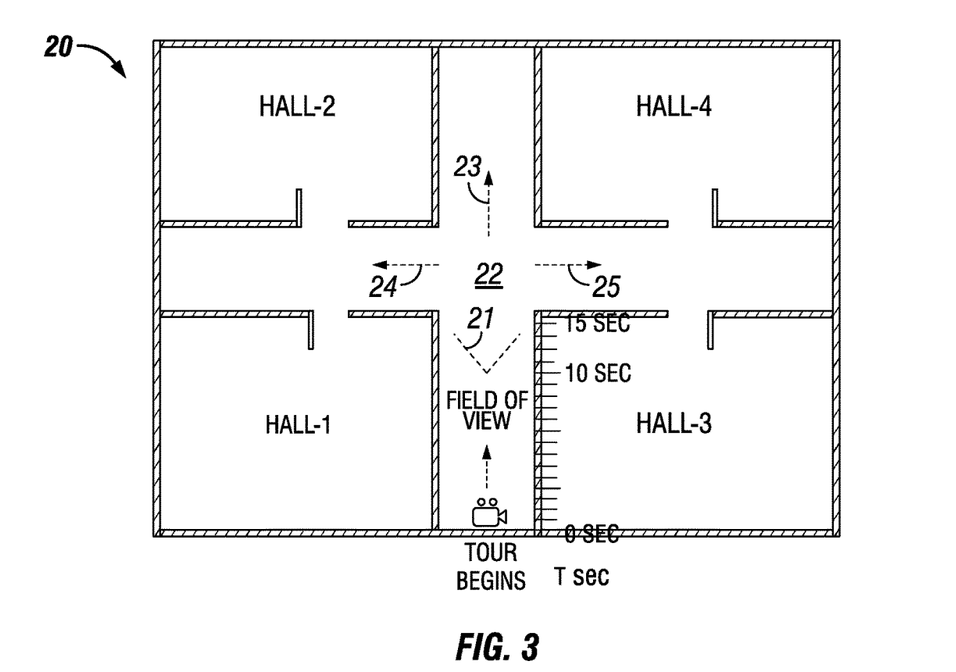
FIG. 3 illustrates a layout of a building in which an exemplary virtual tour provides a viewer with a choice in accordance with an embodiment of the present disclosure.

FIG. 3 illustrates a layout of a building 20 in which an exemplary virtual tour provides a viewer with a choice in accordance with an embodiment of the present disclosure. At certain points in the tour, the viewer is provided with options to choose which direction to continue. The viewer starts the video at timeline 0, which is the entrance area of the virtual tour. At playback time t=10 seconds, the viewer's field of view 21 indicates the viewer is approaching a crossroad 22 where two corridors meet. The viewer has three options: move forward 23, move left 24, or move right 25. In order to highlight these options to the viewer, the video player may overlay a banner notification in the field of view between playtime t=10 seconds and t=15 seconds prompting the viewer to choose which direction he/she would like to continue. If the viewer has not made a decision by playtime t=15 seconds, the video may stop and wait for the viewer to decide, or may continue with a default selection.

The graphical elements are adjusted according to the perspective changes between the viewer position and the element position in the video. This correction can be realized as way-points or as individual position markers at each video frame.

Figure 4:
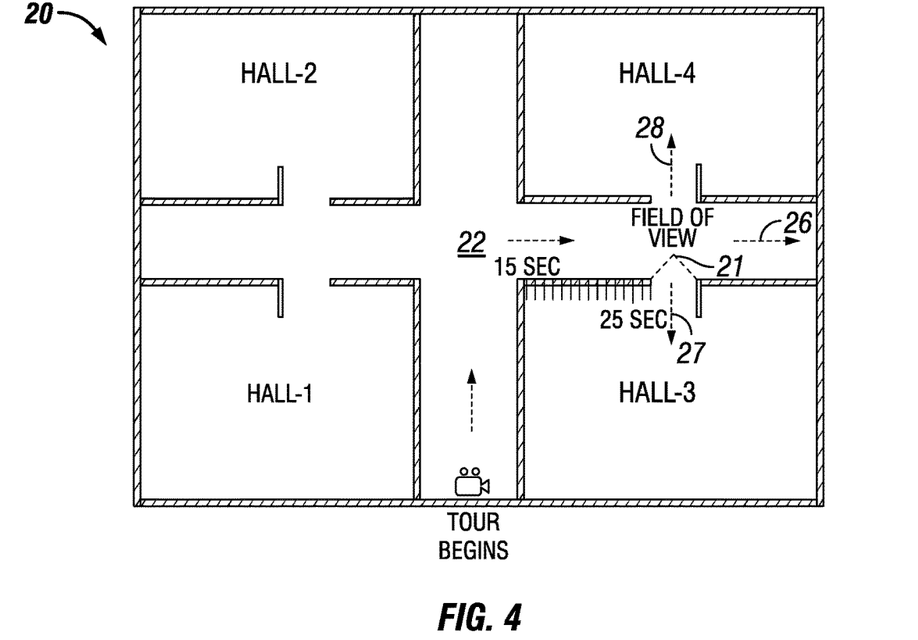
FIG. 4 illustrates an additional choice provided to the viewer during the exemplary virtual tour of the building of FIG. 3.

FIG. 4 illustrates an additional choice provided to the viewer during the exemplary virtual tour of the building of FIG. 3. FIG. 4 assumes that at time point t=15 seconds, the viewer chose to move to the right upon reaching the crossroad 22. When the playback approaches time point t=25 seconds, the system prompts the viewer to either move forward 26, enter Hall-3 (i.e., move right) 27, or enter Hall-4 (i.e., move left) 28. If the viewer tilts his head so that the field of view 21 is directed to the entrance of Hall-3 (i.e., the path 28 to Hall-4 and the forward direction 26 are no longer visible), the video player moves the video directly to Hall-3. Thus, in this case the field of view determines which direction the viewer will continue moving. When the viewer decides to move left or right, the video player changes the video playback. The video recording needs to be done accordingly.

Figure 5:
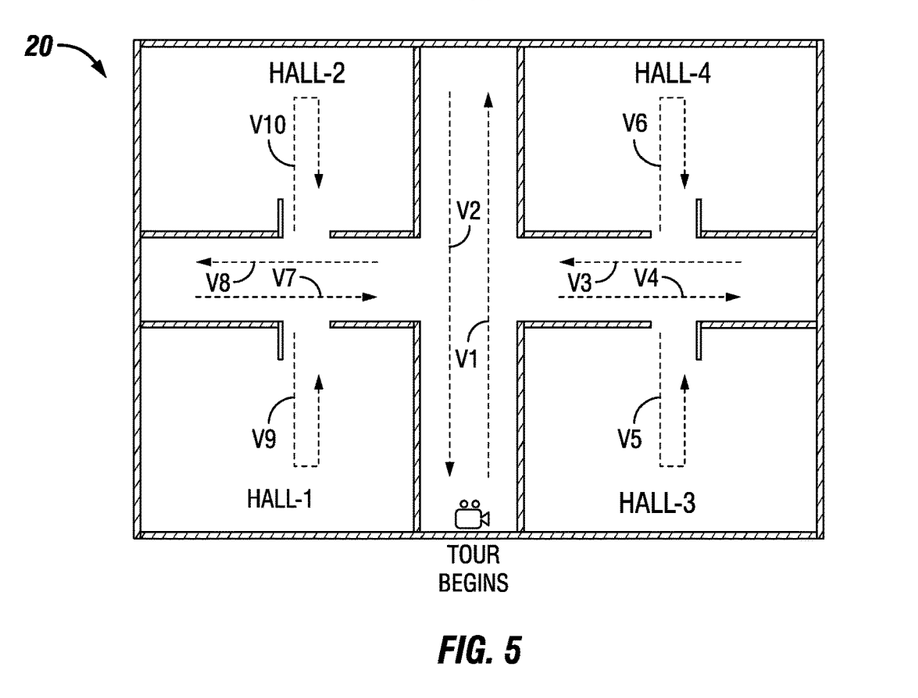
FIG. 5 illustrates an exemplary method of recording a virtual tour of the building of FIG. 3 in accordance with an embodiment of the present disclosure.

FIG. 5 illustrates an exemplary method of recording a virtual tour of the building 20 of FIG. 3 in accordance with an embodiment of the present disclosure. In this embodiment, the complete virtual tour is recorded as a number of smaller video sections v1-v8, where each video section represents a certain geographic area in the complete experience. In this embodiment, a video section is recorded in each geographic area in both a forward and a backward direction. In the beginning corridor, for example, v1 is recorded in the forward direction, and v2 is recorded in the backward direction returning to the starting point. In the corridor to the right of the intersection, v3 and v4 are recorded in the forward and backward directions. In Hall-3, the video v5 is recorded by a camera, which first moves forward into Hall-3 and then turns around and moves out of Hall-3. In Hall-4, the video v6 is recorded by the camera moving forward into Hall-4, turning around, and moving out of Hall-4. In the corridor to the left of the intersection, v7 and v8 are recorded in the forward and backward directions. In Hall-1, the video v9 is recorded by moving the camera forward into Hall-1, turning around, and moving out of Hall-1. In Hall-2, the video v10 is recorded moving forward into Hall 2, turning around, and moving out of Hall 2.

The video sections are recorded in both directions because the video coding structure and the prediction of video frames is linear only in one direction (i.e., IBBP . . . ). Playing a video in reverse is very computationally intensive, since decoding of a Group of Pictures (GoP) happens from the front, and is then rendered in reverse order. In order to simplify this playback, the video is available with playback in both directions.

Figure 6:
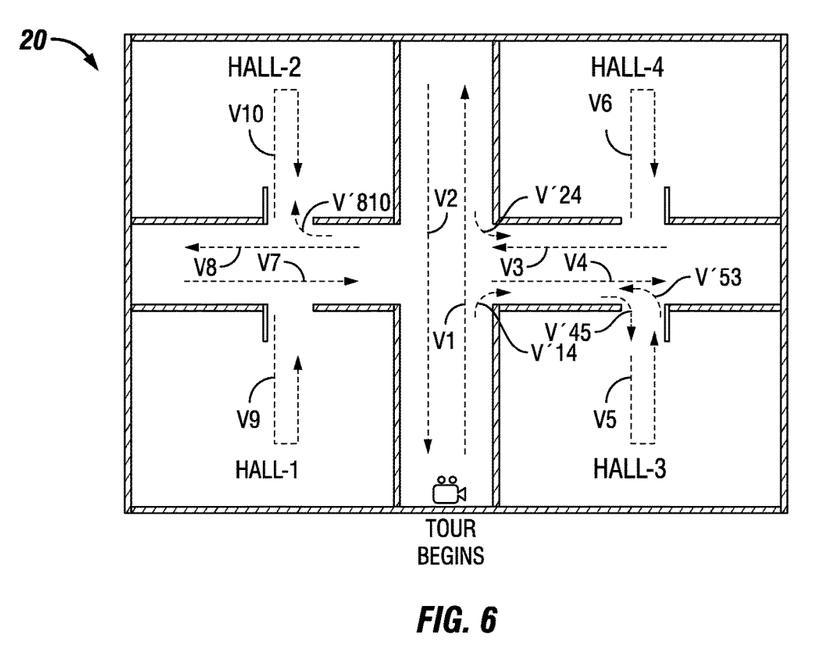
FIG. 6 illustrates the use of transition videos to link different video sections in an exemplary embodiment of the present disclosure.

FIG. 6 illustrates the use of transition videos to link different video sections in an exemplary embodiment of the present disclosure. The directions provided to the user will change depending on the direction in which the user is moving. A viewer moving from the beginning of the tour forwards along v1 will turn right to move to v4, whereas a viewer moving backwards along v2 will turn left to move to v4. To make a smooth transition from v1 to v4, the system may insert a short transition video v'14. Alternatively, to make a smooth transition from v2 to v4, the system may insert a short transition video v'24.

The complete experience is segmented in to a set of smaller videos, to allow the viewer to move freely. Virtually, the viewer is changing videos when the viewer changes directions. For example, the virtual tour illustrated in FIG. 6 is realized by ten main video sections (videos v1 to v10, where videos v5, v6, v9 and v10 each contain forward and backward movements). Each section represents part of the overall video. In a scenario in which a viewer chooses to explore Hall 3 and then Hall 2, the video player needs to play the video sections according to the following sequence: v1 (until the middle of v1)→v4→v5→v3→v8→v10. To provide smooth transitions, transition videos may be inserted between each of the video sections when a change of direction is involved. For example, when the viewer chooses to explore Hall 3 and then Hall 2, the tour may include transition videos v'14 (v1 to v4), v'45 (v4 to v5), v'53 v5 to v3), and v'810 (v8 to v10).

Figure 7:
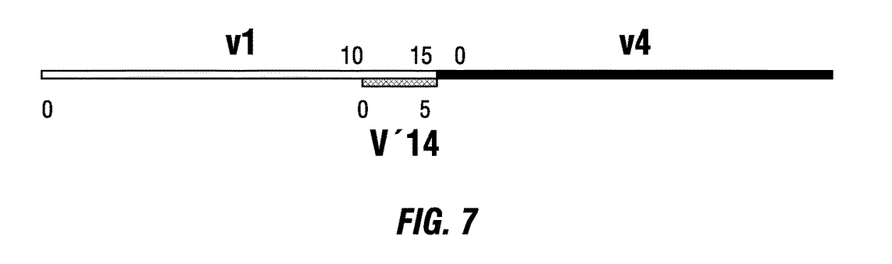
FIG. 7 illustrates a timeline showing an example of the timing of a transition video in relation to two video sections.

FIG. 7 illustrates a timeline showing an example of the timing of a transition video in relation to two video sections, in this case v'14 in relation to videos v1 and v4. In this particular case, transition video v'14 has a duration of 5 seconds and replaces the segment of video v1 occurring between 10 seconds and 15 seconds of v1. At the conclusion of transition video v'14, video v4 is started. Other transition videos may have similar timing characteristics.

Figure 8:
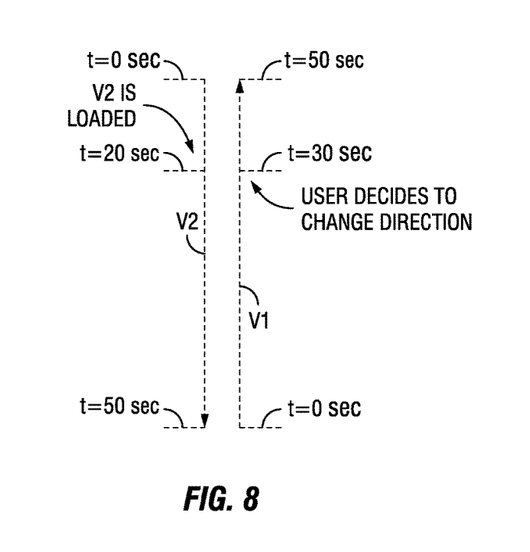
FIG. 8 illustrates a scenario in which the viewer interrupts a currently viewed video section by virtually turning around before reaching the end of the current video section.

FIG. 8 illustrates a scenario in which the viewer interrupts a currently viewed video section by virtually turning around before reaching the end of the current video section. The system accommodates the viewer's change of direction by switching to a reverse direction video section at a time point corresponding to the geographical location where the viewer turns around. For example, assume the viewer begins the tour and moves along v1, which has a length of 50 seconds. The viewer then decides at time point t=30 seconds to change direction. The system then loads v2, which also has a length of 50 seconds, and begins playback of v2 at time point t=20 seconds, which corresponds to the same geographic point as time point t=30 seconds of v1.

Figure 9:
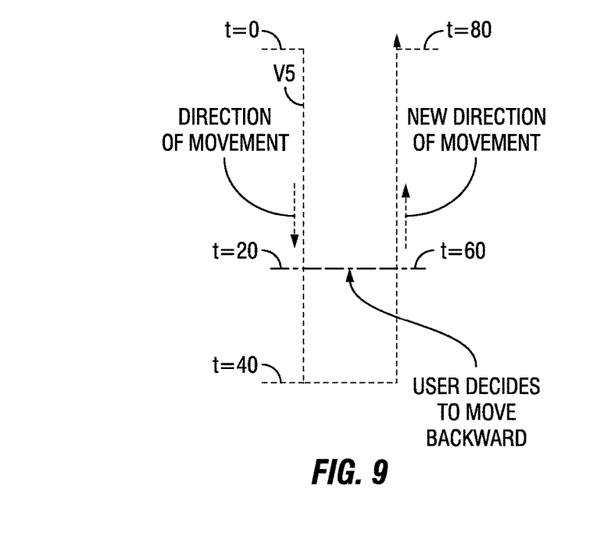
FIG. 9 illustrates a scenario in which the viewer interrupts the currently viewed video section by virtually turning around before reaching the point where the current video section reverses direction.

FIG. 9 illustrates a scenario in which the viewer interrupts the currently viewed video section by virtually turning around before reaching the point where the current video section reverses direction. Path v5 in Hall-3 of FIGS. 5 and 6 is shown for illustrative purposes. In this example, the viewer decides to leave Hall-3 early and virtually turns around after moving only halfway down the v5 path moving into Hall-3. Assume also that the video v5 is 80 seconds in duration, with 40 seconds moving into Hall 3 and 40 seconds moving out of Hall 3. If the recording camera moved with constant speed, and the metadata describes that the same track was recorded forward and backward, then the time points t=20 seconds and t=60 seconds both represent the same geographic location halfway into Hall-3, but recorded in different directions. Therefore, in this scenario, the video player jumps from time point t=20 seconds to time point t=60 seconds of video v5 to accommodate the viewer turning around early.

Figure 10:
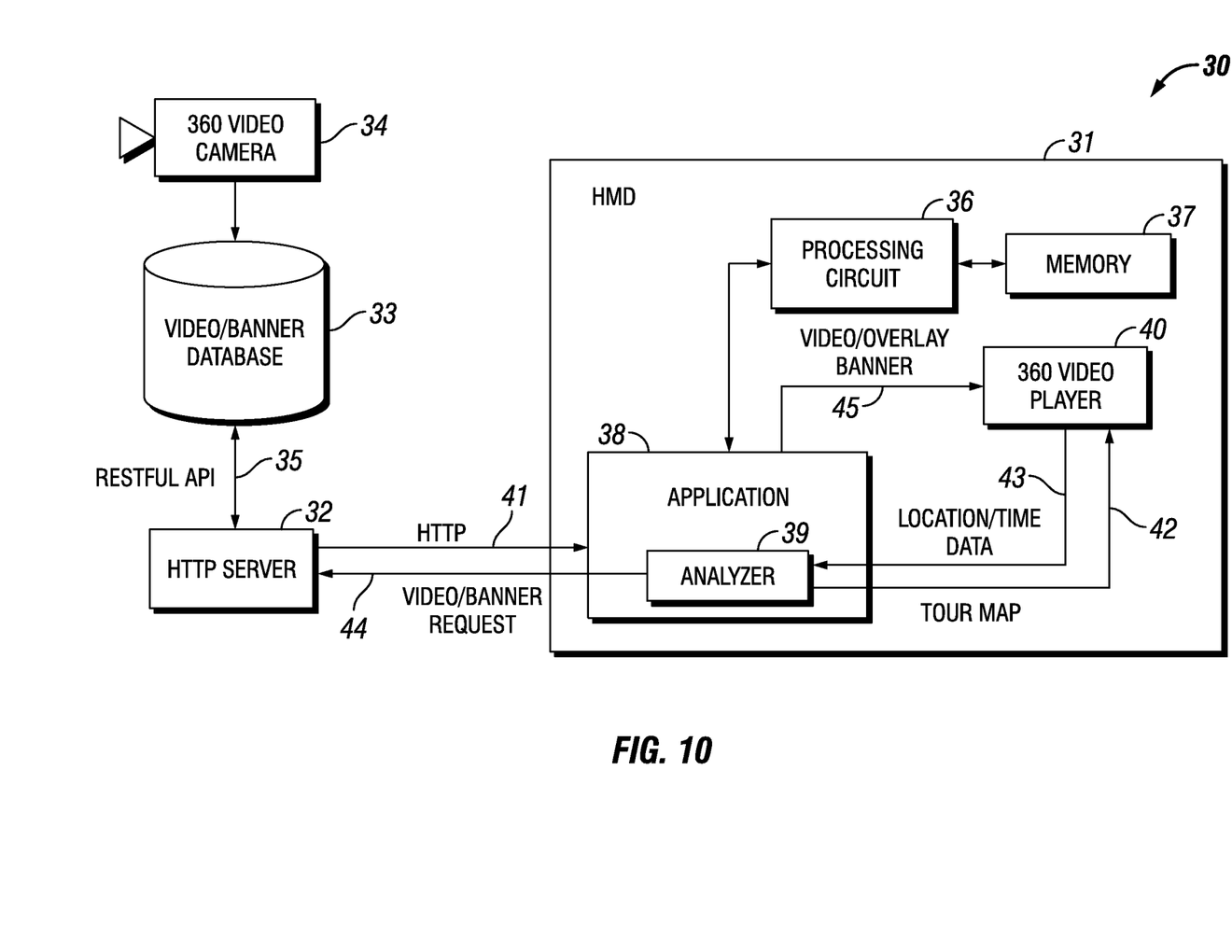
FIG. 10 is a functional block diagram of an exemplary embodiment of the system of the present disclosure.

FIG. 10 is a functional block diagram of an exemplary embodiment of the system 30 of the present disclosure. In this embodiment, the system includes an HMD 31, an HTTP server 32, a Video/Banner database 33, and a 360 omnidirectional video camera 34. A Restful API 35 may be utilized by the HTTP server to retrieve videos and banner notifications from the Video/Banner database.

Operation of the HMD 31 may be controlled by a processing circuit 36 coupled to a non-transitory memory 37. The processing circuit may execute an Application 38 that includes an Analyzer 39. A 360 video player 40 plays the videos shown to the viewer on the HMD. Initially, the HTTP server 32 may obtain a VR tour manifest from the Video/Banner database 33 and forward the manifest to the Application 38 over an HTTP connection 41. At the Application, the Analyzer 39 creates a tour map from the manifest, and forwards the tour map over connection 42 to the 360 video player 40 for presentation to the viewer.

When the viewer decides a starting point for the virtual tour, the 360 video player 40 sends location/time data 43 to the Analyzer 39. The Analyzer determines that the location/time data corresponds to video v1 and sends a request 44 for video v1 to the HTTP server 32. The HTTP server forwards video v1 to the Application 38 over the HTTP connection 41. The Application forwards the video v1 in a stream 45 to the 360 video player 40 for decoding and presentation to the viewer. More detailed operation of the system, including the retrieval of banner notifications from the database, is described below in connection with FIG. 12.

Figure 11:
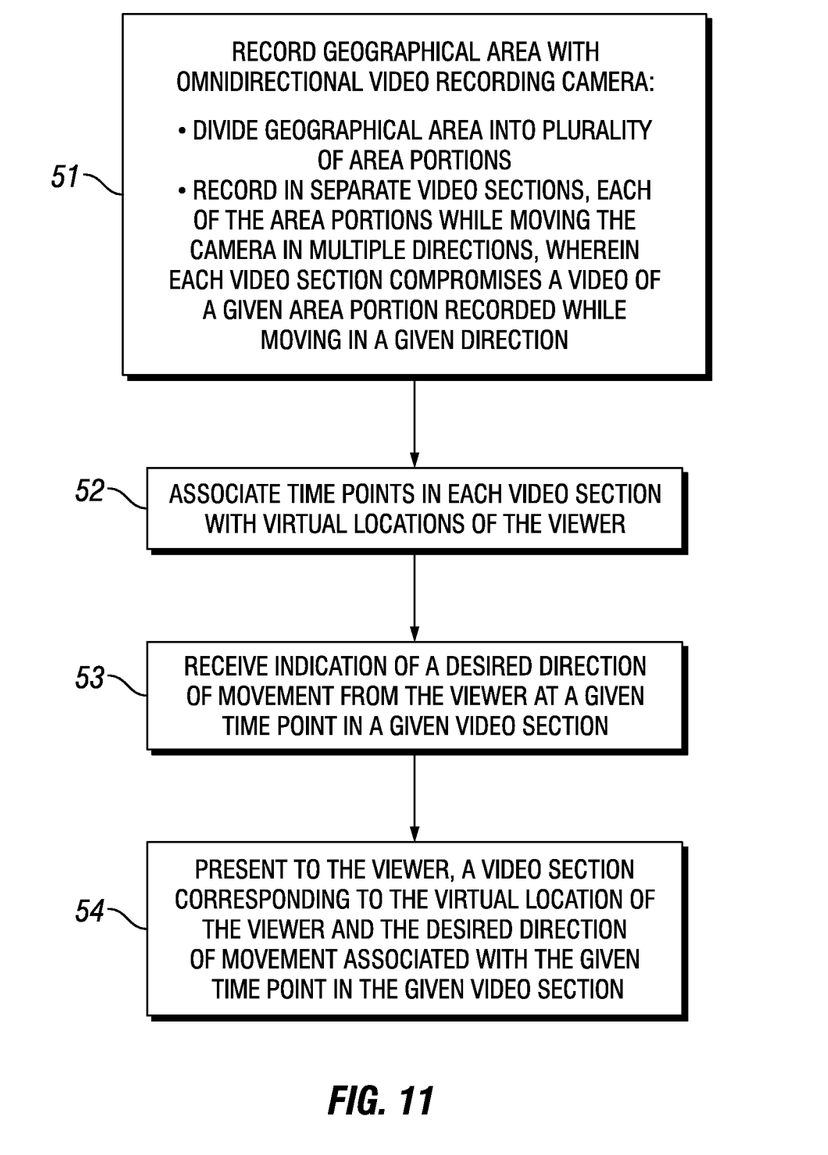
FIG. 11 is a flow chart illustrating the steps of an exemplary embodiment of the method of the present disclosure.

FIG. 11 is a flow chart illustrating the steps of an exemplary embodiment of the method of the present disclosure. The method is performed by the system of FIG. 9 to record a video and play back the video to a viewer in a Virtual Reality (VR) environment. At step 51, a geographical area is recorded with the 360 omnidirectional video camera 34. To make the recording, the geographical area is divided into a plurality of area portions. Each of the area portions is recorded in separate video sections while moving the camera in multiple directions. Each video section comprises a video of a given area portion recorded while moving in a given direction. At step 52, time points in each video section are associated with virtual locations of the viewer. At step 53, an indication is received of a desired direction of movement from the viewer at a given time point in a given video section. At step 54, a video section is presented to the viewer. The video section corresponds to the virtual location of the viewer and the desired direction of movement associated with the given time point in the given video section.

Figure 12:
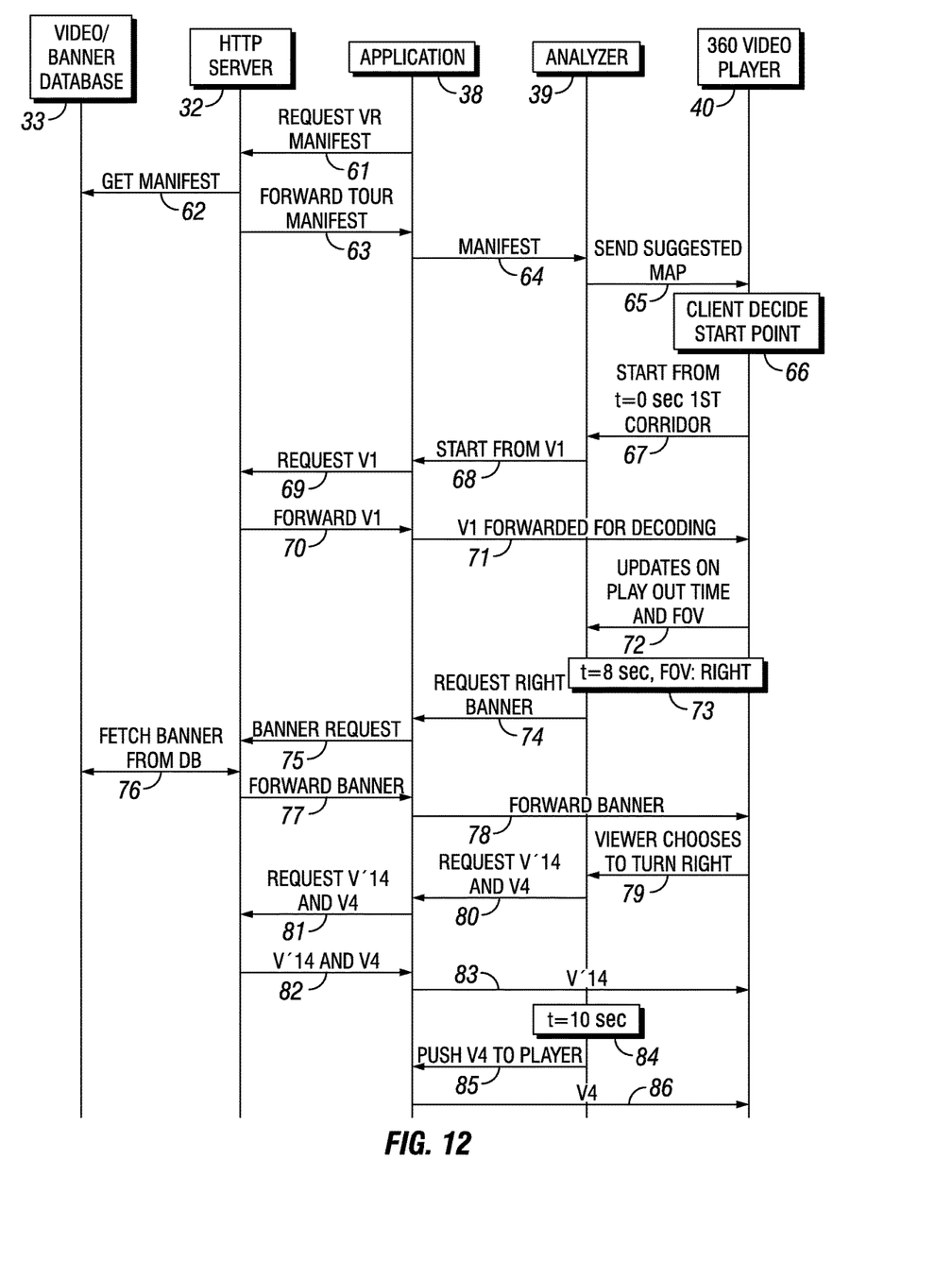
FIG. 12 is a signaling diagram illustrating an exemplary embodiment of a method of video playback in accordance with the present disclosure.

FIG. 12 is a signaling diagram illustrating an exemplary embodiment of a method of video playback in accordance with the present disclosure. Initially, the Application 38 requests a VR tour manifest from the HTTP server 32 at step

61. At step 62, the HTTP server retrieves the manifest from the Video/Banner database 33. At step 63, the HTTP server forwards the manifest to the Application, which forwards the manifest to the Analyzer 39 at step 64. The Analyzer analyzes the manifest and creates and sends a suggested tour map to the 360 video player 40 at step 65.

At step 66, the 360 video player 40 receives an input from the viewer indicating a decided starting point for the VR tour. At step 67, the 360 video player sends a message to the Analyzer 39 indicating the decision to start the tour at time point t=0 in the first corridor. The Analyzer determines this is the beginning of video v1 and sends a message 68 to the Application 38 to start from video v1.

At step 69, the Application 38 requests video v1 from the HTTP server 32, which forwards video v1 to the Application at step 70. At step 71, the Application forwards video v1 to the 360 video player 40 for decoding and presentation to the viewer. The 360 video player presents video v1 to the viewer and provides updates to the Analyzer 39 at step 72. At 73, the updates indicate time point t=8 seconds and the viewer has shifted the field of view to the right. With reference to FIG. 3, it can be seen that at time point t=8 seconds, the viewer is approaching the crossroad (intersection) where a decision is to be made regarding the desired direction to proceed. Therefore, at step 74, the Analyzer sends a request to the Application requesting a right banner notification. At step 75, the Application sends the banner request to the HTTP server 32. At step 76, the HTTP server fetches the banner notification from the Video/Banner database 33, and forwards the banner notification to the Application at step 77.

At step 78, the Application 38 forwards the banner notification to the 360 video player 40, which displays it to the viewer and waits for viewer input regarding the direction to move at the crossroad 22. At step 79, the 360 video player forwards to the Analyzer 39, the viewer's choice to turn right. The Analyzer analyzes the location and direction of turn, and at step 80 sends a request to the Application requesting transition video v'14 and video v4. At step 81, the Application sends the request for transition video v'14 and video v4 to the HTTP server 32. At step 82, the HTTP server forwards transition video v'14 and video v4 to the Application.

At step 83, the Application 38 forwards transition video v'14 to the 360 video player 40 for presentation to the viewer. Upon detecting time point t=10 seconds, the Analyzer 39 sends and instruction 85 to the Application to push video v4 to the 360 video player. At step 86, the Application pushes video v4 to the 360 video player.

Figure 13:
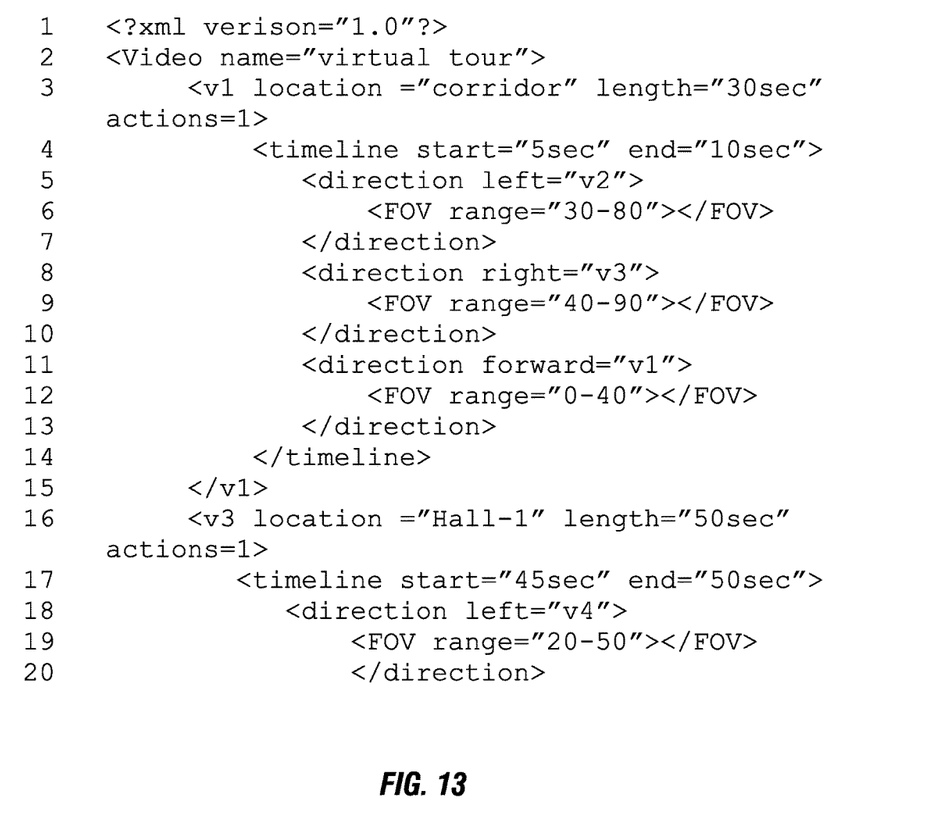
FIG. 13 shows an example of metadata in XML format utilized to create a tour map in accordance with an embodiment of the present disclosure.

FIG. 13 shows an example of metadata in XML format utilized to create a tour map in accordance with an embodiment of the present disclosure. Although the metadata is shown in XML format, the metadata may be created and stored in other formats such as JSON, YAML, or a new timed metadata track in MP4 format. The video sequences may be described in a tree-shaped hierarchy, where each video section represents a parent node, which contains all actions within the corresponding timeline, field of view, and possible directions of movement.

During the video production, the producer may describe in the metadata, the sequence of all video sections and all the possible actions that may take place during the video timeline. The client device uses this metadata to build a timeline map with a set of commands, where the client can analyze the current timeline and field of view for the video and connect it to the current location on the map.

In the drawings and specification, there have been disclosed typical preferred embodiments of the disclosure and, although specific terms are employed, they are used in a generic and descriptive sense only and not for purposes of limitation, the scope of the invention being set forth in the following claims.

What is claimed is:

1. A method of recording a video and playing back the video to a viewer in a Virtual Reality (VR) environment, the method comprising:
    recording a geographical area with an omnidirectional video recording camera, wherein recording includes:
        dividing the geographical area into a plurality of area portions; and
        recording, in separate video sections, each of the area portions while moving the camera in multiple directions, wherein each video section comprises a video of a given area portion recorded while moving in a given direction;
    associating time points in each video section with virtual locations of the viewer;
    receiving an indication of a desired direction of movement from the viewer at a given time point in a given video section; and
    presenting to the viewer, a video section corresponding to the virtual location of the viewer and the desired direction of movement associated with the given time point in the given video sections;
    wherein recording each of the area portions comprises:
        recording a first video section while moving the camera in a forward direction through the area portion; and
        recording a second video section while moving the camera in a backward direction through the area portion;
    wherein the method further comprises:
        presenting the first video section to the viewer;
        detecting that the viewer has reversed a field of view from the forward direction to the backward direction; and
        presenting the second video section to the viewer at a virtual location corresponding to the time of the field of view reversal.

2. The method according to claim 1, wherein the geographical area is a building, and the area portions comprise rooms and corridors within the building.

3. The method according to claim 1, further comprising:
    while the viewer views a current video section, detecting that the viewer is approaching a virtual location where a second video section, recorded while moving in a different direction than the current video section, intersects the current video section, thereby creating a virtual intersection; and
    presenting to the viewer, a banner notification indicating that the viewer can choose which direction to proceed at the virtual intersection.

4. The method according to claim 3, further comprising:
    detecting that the viewer has changed a field of view to proceed onto the second video section at the virtual intersection; and
    presenting the second video section to the viewer beginning at the virtual intersection.

5. The method according to claim 4, further comprising:
    prior to presenting the second video section to the viewer, presenting to the viewer, a transition video providing a smooth transition from the current video section to the second video section.

6. The method according to claim 1, further comprising:
    while the viewer views a current video section, detecting that the viewer is approaching a virtual location where a second video section, recorded while moving in a different direction than the current video section, intersects the current video section, thereby creating a virtual intersection;

detecting that the viewer has changed a field of view to proceed onto the second video section at the virtual intersection; and presenting the second video section to the viewer beginning at the virtual intersection.

7. The method according to claim 6, further comprising:
prior to presenting the second video section to the viewer, presenting to the viewer, a transition video providing a smooth transition from the current video section to the second video section.

8. A method of recording a video and playing back the video to a viewer in a Virtual Reality (VR) environment, the method comprising:

recording a geographical area with a video recording camera moving in a forward direction through the geographical area to create a first video section, and moving in a backward direction through the geographical area to create a second video section;

associating time points in the first and second video sections with virtual locations of the viewer;

on a video player, playing back the first video section to the viewer;

detecting that the viewer has reversed a field of view from the forward direction to the backward direction at a reversal time point prior to the end of the first video section; and on the video player, presenting the second video section to the viewer beginning at a virtual location corresponding to the reversal time point in the second video section.

9. A Head-Mounted Display (HMD) apparatus configured to present a plurality of video sections to a viewer, the HMD apparatus comprising:

a processing circuit coupled to a non-transitory memory configured to store computer readable program code;

a video player; and an application configured to interface with a server to retrieve a manifest and the plurality of video sections;

wherein when the processing circuit executes the computer readable program code, the HMD apparatus is caused to present to a viewer a plurality of video sections defined by the manifest, wherein the plurality of video sections is presented in a sequence determined by choices made by the viewer by positioning a field of view or responding to at least one banner notification;

wherein the manifest includes metadata describing the sequence of all video sections and all possible actions the viewer can take at different time points in each video section, wherein an analyzer in the application uses the metadata to build a timeline map enabling the analyzer to analyze a timeline and field of view within a current video section and determine a current location on the timeline map;

wherein:
the HMD apparatus is further caused to present a first video section of the plurality of video sections that starts at a desired starting point of the viewer; and
the analyzer is further configured to:
receive from the video player, an indication that the viewer has chosen to proceed onto a second video section of the plurality of video sections; and
send a request to the application to retrieve, from the server, the second video section and a transition video providing a smooth transition from the first video section to the second video section and to send the transition video to the video player.

10. The HMD apparatus according to claim 9, wherein the plurality of video sections are recorded in a geographical area, each video section being recorded while moving an omnidirectional video recording camera in a different direction through the geographical area.

11. The HMD apparatus according to claim 9, wherein the analyzer is configured to:
receive through the application, the manifest from the server;
determine a suggested timeline map for a virtual tour; and
send the suggested timeline map to the video player.

12. The HMD apparatus according to claim 11, wherein the analyzer is further configured to:
receive from the video player, the viewer's desired starting point for the virtual tour; and
send a request to the application to retrieve from the server and send to the video player, a first video section that starts at the desired starting point.

13. The HMD apparatus according to claim 12, wherein the analyzer is further configured to:
receive from the video player, updates on playout time and the viewer's field of view in the first video section;
determine from the playout time that the viewer is approaching a virtual location where a second video section, recorded while moving in a different direction than the first video section, intersects the first video section, thereby creating a virtual intersection;
receive from the video player, an indication that the viewer has chosen to proceed onto the second video section; and
send a request to the application to retrieve from the server, the second video section and a transition video providing a smooth transition from the first video section to the second video section, and to send the transition video to the video player.

14. The HMD apparatus according to claim 13, wherein the indication that the viewer has chosen to proceed onto the second video section comprises an indication that the viewer has shifted the viewer's field of view into the different direction of the second video section.

15. The HMD apparatus according to claim 13, wherein when the analyzer determines from the playout time that the viewer is approaching the virtual location where the second video section intersects the first video section, the analyzer is further configured to:
send a request to the application to retrieve from the server and send to the video player, the at least one banner notification indicating that the viewer can choose which direction to proceed at the virtual intersection;
wherein the indication that the viewer has chosen to proceed onto the second video section comprises an indication that the viewer has responded to the at least one banner notification by inputting a choice to proceed onto the second video section.

16. The HMD apparatus according to claim 13, wherein the analyzer is further configured to:
determine that the playout time for starting the second video section has arrived; and
send a request to the application to push the second video section to the video player.

17. A video recording and playback system, comprising:
a database configured to store a manifest and a plurality of video sections recorded in a geographical area;

a server configured to retrieve the manifest and the plurality of video sections from the database; and a Head-Mounted Display (HMD) apparatus configured to present the video sections to a viewer, the HMD apparatus comprising:
  a processing circuit coupled to a non-transitory memory configured to store computer readable program code;
  a video player; and
  an application configured to interface with a server to retrieve the manifest and the plurality of video sections;
  wherein when the processing circuit executes the computer readable program code, the HMD apparatus is caused to present to a viewer, a plurality of video sections defined by the manifest, wherein the plurality of video sections is presented in a sequence determined by choices made by the viewer by positioning a field of view or responding to at least one banner notifications;
wherein the manifest includes metadata describing the sequence of all video sections and all possible actions the viewer can take at different time points in each video section, wherein an analyzer in the application uses the metadata to build a timeline map enabling the analyzer to analyze a timeline and field of view within a current video section and determine a current location on the timeline map;
wherein:
  the HMD apparatus is further cause to present a first video section of the plurality of video sections that starts at a desired starting point of the viewer; and
  the analyzer is further configured to:
    receive from the video player, and indication that the viewer has chosen to proceed onto a second video section of the plurality of video sections; and
    send a request to the application to retrieve, from the server, the second video section and a transition video providing a smooth transition from the first video section to the second video section and to send the transition video player.

18. The video recording and playback system according to claim 17, wherein the plurality of video sections are recorded in a geographical area, each video section being recorded while moving an omnidirectional video recording camera in at least two different directions through the geographical area.

19. The video recording and playback system according to claim 17, wherein the analyzer is configured to:
  receive from the video player, updates on playout time and the viewer's field of view in the first video section;
  determine from the playout time that the viewer is approaching a virtual location where a second video section, recorded while moving in a different direction than the first video section, intersects the first video section, thereby creating a virtual intersection;
  receive from the video player, an indication that the viewer has chosen to proceed onto the second video section; and
  send a request to the application to retrieve from the server, the second video section and a transition video providing a smooth transition from the first video section to the second video section, and to send the transition video to the video player.

20. The video recording and playback system according to claim 19, wherein the indication that the viewer has chosen to proceed onto the second video section comprises an indication that the viewer has shifted the viewer's field of view into the different direction of the second video section.

21. The video recording and playback system according to claim 19, wherein when the analyzer determines from the playout time that the viewer is approaching the virtual location where the second video section intersects the first video section, the analyzer is further configured to:
  send a request to the application to retrieve from the server and send to the video player, the at least one banner notification indicating that the viewer can choose which direction to proceed at the virtual intersection;
  wherein the indication that the viewer has chosen to proceed onto the second video section comprises an indication that the viewer has responded to the at least one banner notification by inputting a choice to proceed onto the second video section.

22. The video recording and playback system according to claim 19, wherein the analyzer is further configured to:
  determine that the playout time for starting the second video section has arrived; and
  send a request to the application to push the second video section to the video player.

* * * * *

UNITED STATES PATENT AND TRADEMARK OFFICE
CERTIFICATE OF CORRECTION

PATENT NO. : 10,712,810 B2  
APPLICATION NO. : 15/835840  
DATED : July 14, 2020  
INVENTOR(S) : Ibrahim et al.

Page 1 of 2

It is certified that error appears in the above-identified patent and that said Letters Patent is hereby corrected as shown below:

In the Specification

In Column 7, Lines 42-43, delete "v'53 v5 to v3)," and insert -- v'53 (v5 to v3), --, therefor.

In the Claims

In Column 10, Line 26, in Claim 1, delete "sections;" and insert -- section; --, therefor.

In Column 12, Line 25, in Claim 13, delete "section;" and insert -- section; and --, therefor.

In Column 12, Line 27, in Claim 13, delete "a" and insert -- the --, therefor.

In Column 12, Lines 30-38, in Claim 13, delete "intersection;
receive from the video player, an indication that the viewer has chosen to proceed onto the second video section; and
send a request to the application to retrieve from the server, the second video section and a transition video providing a smooth transition from the first video section to the second video section, and to send the transition video to the video player." and
insert -- intersection. --, therefor.

In Column 13, Line 20, in Claim 17, delete "notifications;" and insert -- notification; --, therefor.

In Column 13, Line 30, in Claim 17, delete "cause" and insert -- caused --, therefor.

In Column 13, Line 34, in Claim 17, delete "player, and" and insert -- player, an --, therefor.

In Column 14, Line 41, in Claim 17, delete "player." and insert -- to the video player. --, therefor.

In Column 14, Line 4, in Claim 19, delete "section;" and insert -- section; and --, therefor.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,712,810 B2

In Column 14, Line 7, in Claim 19, delete "a" and insert -- the --, therefor.

In Column 14, Lines 9-18, in Claim 19, delete "intersection;
receive from the video player, an indication that the viewer has chosen to proceed onto the second video section; and
send a request to the application to retrieve from the server, the second video section and a transition video providing a smooth transition from the first video section to the second video section, and to send the transition video to the video player." and
insert -- intersection. --, therefor.